Nov. 3, 1964

H. F. MOELLMANN 3,155,103

FUEL CONTROL GAS PRODUCER GOVERNOR
AND SPEED SELECTOR LINKAGE

Filed May 20, 1959

INVENTOR.
HEINZ F. MOELLMANN.
BY
ATTORNEYS.

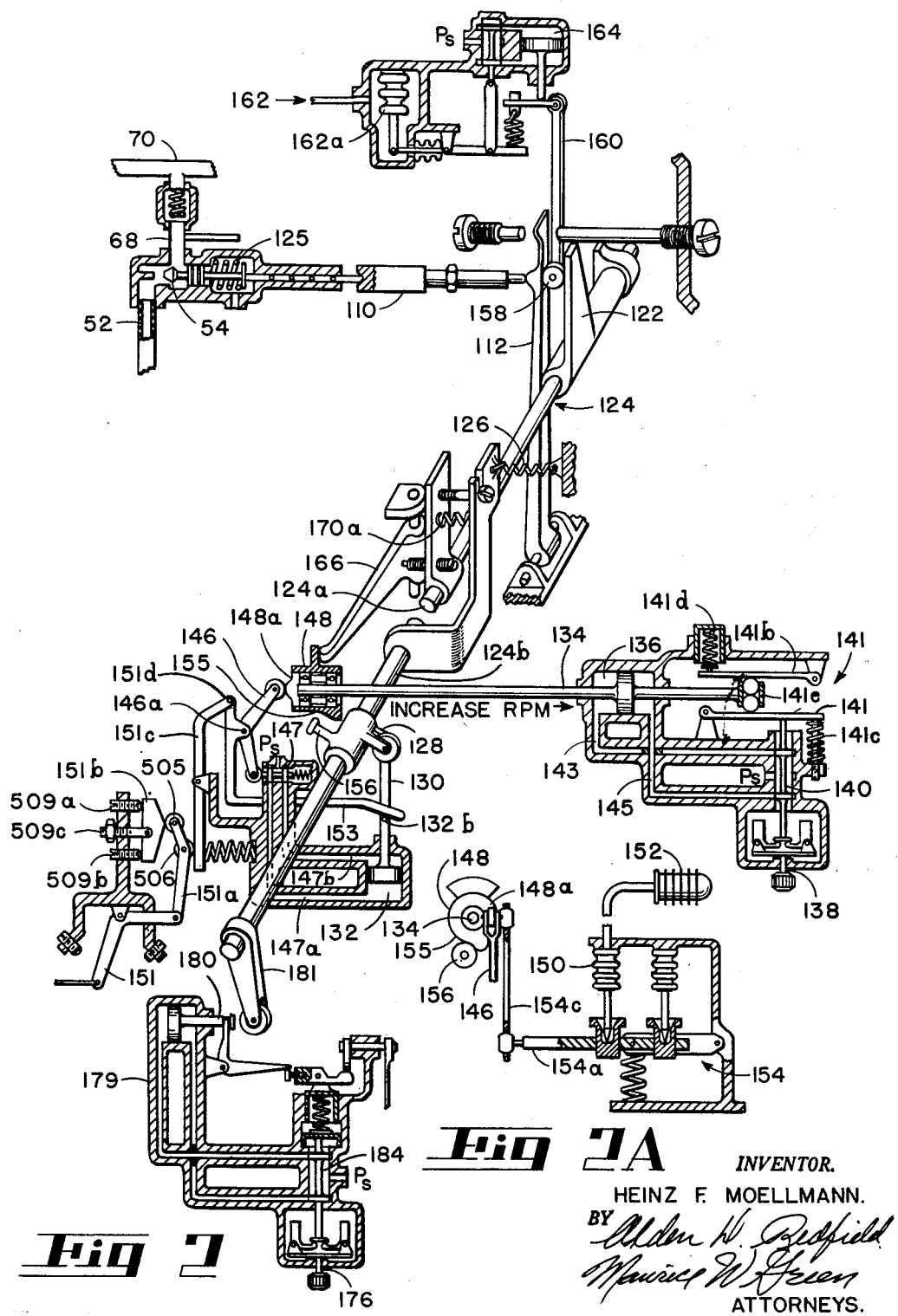

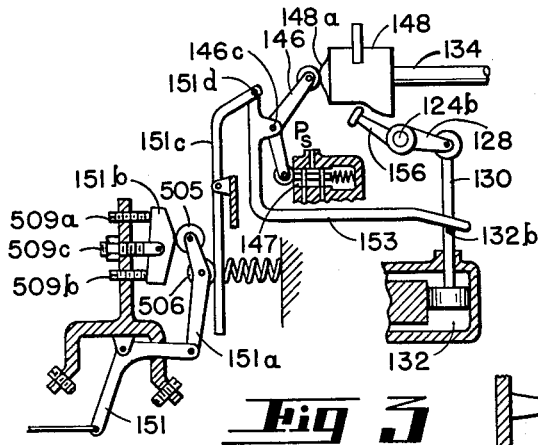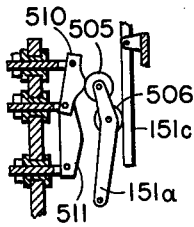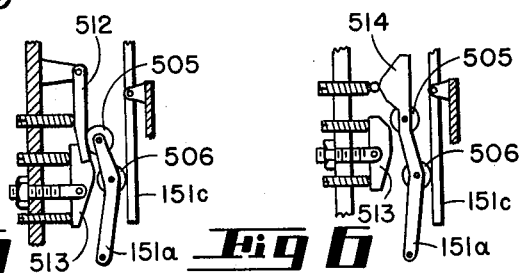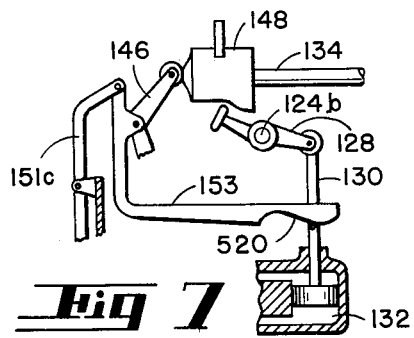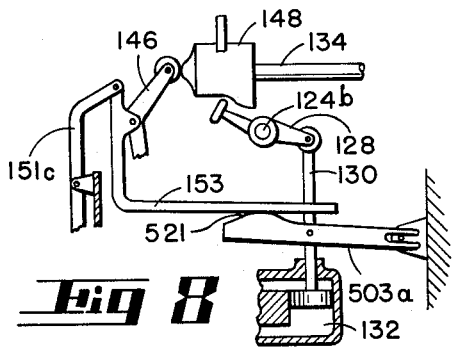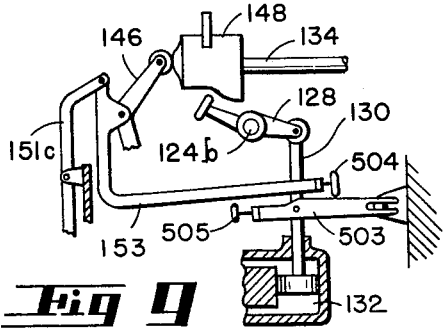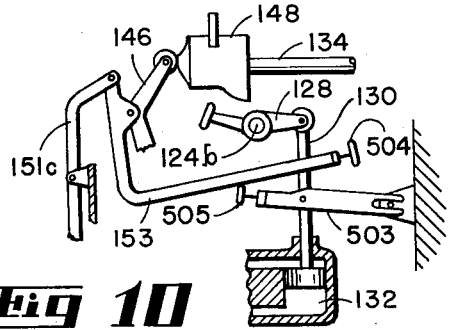

United States Patent Office 3,155,103
Patented Nov. 3, 1964

3,155,103
FUEL CONTROL GAS PRODUCER GOVERNOR
AND SPEED SELECTOR LINKAGE
Heinz F. Moellmann, Stratford, Conn., assignor to Avco Corporation, Lycoming Division, Stratford, Conn., a corporation of Delaware
Filed May 20, 1959, Ser. No. 814,531
2 Claims. (Cl. 137—18)

This invention relates to gas producer rotor speed governor and speed selector linkages for a fuel system of a gas turbine engine, controlling the fuel flow for maintaining gas producer rotor speed and providing means for manual change in speed through main power lever actuation.

It is important that linkages affording automatic controls for steady-state operation, acceleration and deceleration, as well as to assure maximum and minimum requirements, shall be incorporated in the mechanism with a minimum of complication, the assurance of reasonable accuracy, and the provision of a type of mechanism which will be practical in operation and also to avoid complicated arrangements susceptible to friction and inaccuracies.

It is a specific object to provide a feedback mechanism with the means to modify the action thereof between high power and low power operation to compensate for difference in conditions in a satisfactory manner.

It is a further object to provide a speed selector linkage with a stationary selector cam having portions thereof independently adjustable for regions of operation, such as maximum power, idle, and reverse thrust conditions.

The above and other objects of the invention will appear from the following more detailed description and by reference to the accompanying drawings forming a part hereof, and wherein:

FIGURES 2 and 2A are perspective showings of the fuel control of this invention, including the linkage mechanism for gas producer speed governor and speed selector.

FIGURE 3 is a view of the portion of the linkage mechanism, including the speed selector and speed governor linkages.

FIGURES 4, 5 and 6 show modified forms of speed selector cams with independently adjustable portions corresponding to various regions in the range of speed and power.

FIGURE 7 is a showing of the feedback lever mechanism with a cam surface on the end thereof.

FIGURE 8 is a further modification of the mechanism for modifying the action of the feedback lever for various regions of operation.

FIGURES 9 and 10 show another modified form of feedback lever, showing mechanism in two positions of operation—FIG. 9 for normal power range, and FIG. 10 for idle operation.

Figure 1:
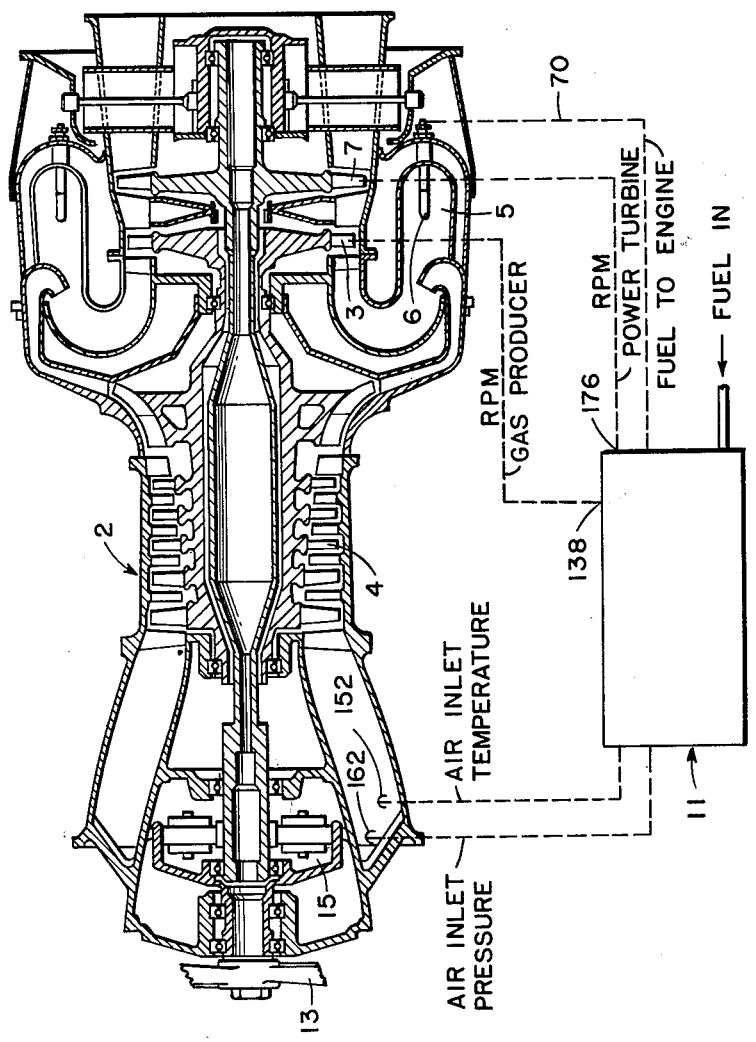
FIGURE 1 is an illustration of a gas turbine engine, with a schematic showing of the fuel control and its relationship to the various parts of the engine.

Referring to FIGURE 1:

A gas turbine power plant 2 employs a compressor driving turbine 3, sometimes called "gas producer turbine," which drives a compressor 4 to furnish compressed air to an annular combustion chamber 5 to which fuel is supplied from nozzles 6 from fuel inlet 70. Turbine 3 and compressor 4 are sometimes individually and collectively referred to in the art as the gas producer portion of the gas turbine. Resultant hot gases from combustion and resultant flow thereof act to drive the power turbine 7 as well as the so-called gas producer turbine 3 in the power plant illustrated. The power turbine 7 drives the propeller 13 through reduction gear 15 and suitable drive shaft. The fuel control is generally designated as 11 in FIGURE 1.

Various parameters of engine operation are diagrammatically illustrated in FIG. 1 as imposing control for fuel flow variation on the fuel control 11. For instance, the r.p.m. of the gas producer turbine 3 is imposed at 138, which is indicated by like reference numeral in FIGURE 2 of the drawings, and also the r.p.m. of the power turbine 7 is imposed at numeral 176 adjacent fuel control 11, which is also designated in FIGURE 2 of the drawings. The air inlet temperature and the air inlet pressure are indicated by their elements at 152 for temperature and 162 for pressure in the inlet to the air compressor 4, and these numerals also refer to the corresponding elements similarly numbered in FIGURE 2.

A main metering valve 54 (FIG. 2) controls fuel flow by its longitudinal position of movement, thereby determining an orifice size and rate of flow for each position made possible by a regulated uniform pressure drop across the valve 54 by mechanism known in the art but not disclosed herein. Therefore, the longitudinal position of member 110 determines the orifice size and amount of fuel flow to the engine. Fuel flows from source at 52, not detailed herein, metered through valve 54 to inlet 68, 70 to the engine.

The metering valve 54 is spring-urged by spring 125 in a direction to the right, as shown in the drawing, and therefore movement to the left is against this spring action, as shown, and a movement of the valve actuating member 110 to the right will increase fuel flow, and a movement in the opposite direction will decrease fuel flow. The various control movements to vary the flow of fuel are impressed upon this control member 110 by means of a rockshaft assembly 124, which by control contact with several levers, all projecting radially from rockshaft 124, such as 181, 128 and 156 for power turbine r.p.m. and gas producer r.p.m., respectively, provides a linkage for the application of the various control parameters above enumerated, acting through the rockshaft, to position the actuating member 110 and thus to vary the orifice opening of the main metering valve 54.

The spring 126 and valve 54 urged by spring 125 tend to rotate the rockshaft clockwise and to open valve 54. Therefore, the limitation opposing the clockwise rotation of rockshaft 124 will be imposed by the most outwardly projecting contact with radial levers 181, 128 and 156, and the control which limits the movement of the valve toward open position to the greater extent—that is, the one calling for least fuel—will override others in its effect with the mechanical arrangement as provided.

It is necessary, for an understanding of the mechanism with which this invention is primarily concerned, to have a general understanding of the operation of the other control units which will operate to complete the mechanism controlling the pressure variation. For instance, the effect of power turbine 7 speed is imposed upon the rockshaft through radial lever 181 of servo mechanism 179, 180, 184, actuated through the power turbine responsive governor 176.

Gas producer 3, 4, speed of rotation actuates the governor 138, which through servo mechanism 140, 136 and linkage mechanism 141 actuates a longitudinal member 134, which is thereby positioned as a function of gas producer 3, 4, r.p.m. from governor 138. The rod 134 moves toward the right, as shown in the drawing and as indicated by an arrow, for increasing r.p.m. of the gas producer 3, 4, and toward the left for decreasing r.p.m. This longitudinal movement acts on a linkage mechanism, making first contact therewith through lever 146, which in turn actuates servo mechanism 132 to act through member 130 upon projecting lever 128 to impose the gas producer speed control variation on the rockshaft 124 to increase or decrease the opening of the fuel metering valve in response thereto.

A variation in temperature of the air entering the compressor is compensated for by so-called 3-D cam 148 rotatably mounted on the axis of the rod 134, as shown. The cam surfaces 148a and 155 of this cam compensate for temperature on varying rotated positions of this cam as controlled by a temperature unit (see FIG. 2A), with sensor 152, bellows 150 and linkage 154a, 154c, more fully set forth in coepnding application Serial No. 814,520, now Patent No. 3,093,969, filed May 20, 1959, and assigned to the same assignee as this invention, and will not be described in detail herein.

Deceleration scheduling mechanism related to deceleration limiting lever 166 is a part of the control mechanism with which the mechanism of this invention cooperates. Such mechanism is however not described in detail herein, but is disclosed and claimed in copending application Serial No. 814,548, now Patent No. 3,083,531, filed May 20, 1959, and assigned to the same assignee as the present invention.

The two part rockshaft 124a, 124b, with overtravel spring 170a forming a connection between the two parts is also described and is a part of the deceleration limiting mechanism. For the purpose of an understanding of the present invention, however, it may be assumed that the two parts of the rockshaft operate as one (as they do in normal steady-state and accelerating conditions) to transmit the variation effects of the various parameters of engine operation to lever 122.

The compensation for variation in air inlet pressure is imposed by the linkage 160, which is moved by the pressure responsive unit 162a which operates through a servo piston 164 to position the roller 158 between the parallel levers 112 and 122, thereby imposing a variation in leverage and in the movement of the lever 110. This mechanism for pressure variation compensation is more completely described and claimed in copending application Serial No. 814,519, filed May 20, 1959, now abandoned and refiled as a continuation application Serial No. 246,876, on December 21, 1962.

One of the major controls for limiting the clockwise rotation of the rockshaft 124, as above mentioned, is the compressor or so-called gas producer turbine speed control. The primary contact on the rockshaft 124b for receiving this control is the radial lever 128 with its contacting member 130 which is actuated through servo piston 132.

Proceeding with the description of the gas producer speed governor linkage:

A centrifugal governor unit 138, actuated by the rotation of the gas producer turbine, causes movement of servo-valve member 140, the increase in speed being reflected in an upward movement of the valve member 140, as shown in the drawings. The valve member works against spring urged linkage 141, which will be described in more detail below and is referred to generally also as the "compressor speed computer" or "gas producer speed computer." The valve member 140 therefore acts against the resilient linkage 141, which acts as a spring and with increasing speed—that is, upward movement of the valve member 140—will cause servo pressure $P_s$ to enter the conduit 143, which will cause the servo piston unit 136 controlling rod 134 to move to the right, as viewed in the drawings.

Such movement will result from an increasing r.p.m. in the gas producer rotation. With decreasing speed of the governor unit 138, the valve member 140 will move downwardly (as viewed in the drawing) and cause servo-pressure $P_s$ to be imposed in conduit 145, which will cause the opposite direction of movement of the rod 134 by the actuation of the servo-piston unit 136, that is, a movement of rod 134 to the left. It is therefore apparent that with increased speed of gas producer rotation the rod 134 is moved to the right (as viewed in the drawings) and with decreased speed of rotation the rod 134 is moved to the left.

With reference to the resilient linkage 141 (also designated as the gas producer turbine speed computer), it may be generally stated that this linkage designated in the assembly as 141 is imposed to place a varying resistance to the movement of the valve member 140 so that the movement of the rod 134 will be substantially proportional to the r.p.m. of the gas producer turbine or a fixed and known variation thereof. The practical effect is a varying spring load for the governor 138 centrifugal weights to act against at the speeds expected. This result is accomplished by the provision of a pivoted lever 141a and a pivoted lever 141b, which as shown in the drawings, have faces spaced from each other and have their lever face portions extending in opposite directions from their respective pivots as shown. Each of these levers is urged toward the other by springs 141c and 141d, and the end of the rod 134 is provided with ball contact 141e which is carried between the faces of the two levers 141a and 141b.

Therefore, the position of the ball contact end 141e of the rod 134 will vary the resistance to movement of the valve member 140. That is, with the maximum position of the roller end 141e to the left, as viewed in the drawings, there will be a greater mechanical advantage afforded against the resilient resistance of the linkage so that in this position the movement of the valve member 140 will be less resistant while, with the movement of the end 141e maximum to the right, as viewed in the drawings, resistance to movement will be greatest. Therefore, the effect of the governor movement 138 which rotates in proportion to gas producer speed will be resisted more at high r.p.m.'s than at low r.p.m.'s. The effect of the linkage 141 is to vary the relationship of the governor speed to the movement of the rod 134 as a function of the speed of the gas producer.

Continuing with a description of the gas producer speed control, it has been established that the rod 134 moves longitudinally substantially in proportion to the variation in gas producer rotative speed. The rod 134 has a so-called 3-D cam 148 rotatably secured to its lefthand end. This cam follows the longitudinal movement of the rod 134 and in one of its functions serves as an abutment to act against the roller end of the lever 146, which lever is pivoted at 146a, and the opposite end of the lever 146 contacts servo valve piston 147.

Considering the linkage just described:

The movement of rod 134 will be to the right on increasing r.p.m. and will cause servo-pressure $P_s$ to enter into conduit 147a, which will move piston 132 outward to rotate the rockshaft section 124b counterclockwise in a direction to reduce the fuel flow rate through the metering valve 54 and to counteract the increase in r.p.m. The opposite direction of movement of the rod 134 on decreasing r.p.m. will cause $P_s$ servo-pressure to be put into conduit 147b and cause piston 132 to move downward and give the opposite effect—that is, an opening of the fuel metering valve 54.

It was above mentioned that the so-called 3-D cam 148 acts as an abutment on the end of rod 134; but it is imposed on such rod for a more definite purpose, namely, to impose a temperature variation effect onto the movement of the lever 146 during steady-state operation. This effect is produced by a temperature bulb 152 (FIG. 2A) located in the air inlet to the compressor (FIG. 1), which, through suitable temperature expanding bellows and linkage 150, 154, rotates the 3-D cam 148 in proportion to temperature (all as shown in FIGS. 2 and 2A).

FIG. 2A also shows an end view of the cam 148 and shows that there is an annular surface 148a against which the end of the lever 146 contacts (see FIG. 2), and thus, as the 3-D cam 148 is rotated in response to temperature variation, the cam surface varies the movement of lever 146 in relation to change in temperature of the inlet air.

In effect, it changes the length of the rod 134 in its contact with the lever 146.

The main power lever 151 is in the form of a bell-crank (as shown) which on manual movement positions a link 151a which is relatively moved by cam surface 151b to tilt a lever 151c. The end of this lever 151c, which will move as a function of the main power lever, is provided with a pivot 151d to which is secured a so-called feedback lever 153. This feedback lever is L-shaped in form and extends from the pivot 151d to the rod 130, which is an extension of the piston 132. A contact pin 132b on this rod provide for feedback lever actuation as the member 130 moves in substantially proportional movement to the fuel metering valve for steady-state operation.

The feedback lever 153 is provided with a pivot 146a, previously mentioned, which is the pivot for the lever 146. It now appears that the pivot 146a, which is on the feedback lever and displaced from the end of the feedback lever, is a pivot which will move as a function to the movement of the main power lever if other parts of the linkage are stationary. If the main power lever 151 is stationary, the pivot 146a will be moved either by the feedback lever or by the movement of rod 134 which is the gas producer speed responsive member. All these movements cause actuation of servo-piston 147.

Referring to FIGURE 2:

The main power lever 151 providing for manual control setting of the gas producer speed control is a bell-crank connected to move a roller supporting bar 151a for longitudinal movement between a stationary cam 151b and a resiliently supported pivot lever 151c. The rollers 505 and 506 carried by the bar 151a are so positioned on the bar that the roller 505 contacts the stationary cam 151b, and the roller 506 contacts the pivoted resiliently supported lever 151c. The stationary cam (so-called "selector cam") 151b is so formed that it is supported on adjusting screws 509a and 509b, the cam itself being pivoted near the center on pivot 509c, as shown.

It is thus possible without changing the total travel of the main power lever 151 to adjust the cam 151b by relative movement of the two independent adjustments 509a, and 509b. The nut on 509c is for locking the adjustment. The movement of the main power lever 151 in a clockwise direction around its pivot and the downward movement of the bar 151a is an increase in power, and therefore the region of the cam 151b shown in the lower portion of the figure is for the maximum power. The center is for idle, and the upper portion is for reverse thrust used in turboprop installations.

Referring to FIGURES 3, 4, 5 and 6 of the drawings:

FIGURE 3 shows the general arrangement in the same general form as shown in FIGURE 2; but FIGURES 4, 5 and 6 show a modified structure of the cam surface 151b, FIGURE 4 showing independent cam portions 510, 511 independently adjustable, as shown, while FIGURE 5 shows another form of independently adjustable cams 512 and 513; and FIGURE 6 shows still another modified form with a cam surface 514 connected on the end of the bar 151a. It is apparent that various forms of independently adjustable cams may be provided with different shapes and arrangement so that the various positions of the main power lever will give varying power conditions by imposing varying positions to the lever 151c which causes movement of the servo-piston 147 to eventually change the position of the lever 128 on the rockshaft 124b through member 130 as previously described.

The feedback lever construction 153 has been previously mentioned in discussion of FIGURES 2 and 3, and FIGURES 7, 8, 9 and 10 show modified forms of this feedback lever construction.

FIGURE 7 shows a cam surface on the end of the feedback lever which will provide for varying action of this lever between high power and idle power operation. Other means of accomplishing this variation between idle power and high power operation and the effect of the feedback lever in such conditions are shown in FIGURES 8, 9 and 10.

All of the modifications shown in FIGURES 7, 8, 9, and 10, have the common purpose of providing the lower contacting end of the feedback lever 153, where it makes contact with the member 130, with a compensation for differences in conditions between low power and high power regions of operation. The general function of the so-called feedback lever 153 is to cut back the control movement which may be initially imposed, calling, for instance, for an increase in power so that the tendency to "hunt" will be minimized and a stable control operation realized. The most advantageous control movement afforded by the feedback lever, changing the fuel flow rate, is different for higher power ranges than it is at lower power. Therefore, it is an advantage to have a different rate of movement on the end of the lever 153, relative to movement of member 130, during the high power range than in the low power range. The modifications shown in FIGURES 7, 8, 9, and 10, are linkage mechanisms for accomplishing this purpose. For instance, the mechanism shown in FIGURES 9 and 10 provides a modifier lever 503 and a contacting member 505 on the end of the modifier lever 503. And for conditions of high power range of operation the contacting member 504 will contact the lever 503, affording a lesser arcuate swing of the lever 153 for a given change in movement of the member 130, while, as shown in FIGURE 10, for idle or near-idle conditions the contacting member 505 will contact the member 153 so that for a given movement of member 130 there will be greater arcuate swing of the lever 153. There will therefore be less speed error for a given fuel flow rate of change at higher power than at low power regions of operation. Contacting members 504 and 505 are independently adjustable, thereby affording effective means to vary the fuel flow rate change for a given speed error with high accuracy and minimum of complication. FIGURES 7 and 8 disclose other means of accomplishing this result—i.e., FIGURE 7 employs a cam surface 520 on the lever 153, and FIGURE 8 uses a cam surface 521 on the modifier lever 503a.

The operation of the speed control linkage might be explained by a typical example. Assume the operator intends to increase the power setting, he would move the power lever 151 clockwise. This movement will bring the roller bar 151a downward so that the pivot point 151d of the lever 151c will move to the right, thereby affecting the position of the pivot point 146a on lever 146 so that the pilot valve 147 will move to the right. As a result the servo piston 132 will move downward and cause rotation of the rockshaft 124 clockwise moving the main metering valve 54 toward open direction allowing an increased fuel flow rate and thus accelerate the engine, including the gas producer turbine, and will cause movement of rod 134 to the right. The amount of this metering valve opening movement is controlled by the feedback lever 153 as follows: The downward motion of piston 132 will move the feedback lever 153 clockwise so that the pivot point 146a moves toward the left thus returning the pilot valve 147 to the neutral position resulting in cutting off the motion of servo piston 132. The increased gas producer speed will be reflected in the flyweights of governor 138 and gas producer speed computer 141 in such a way that the rod 134 will move to the right. The motion of 134 will allow lever 146 to move clockwise on pivot 146a and thereby move servo valve piston 147 toward the left as shown in the FIGURE 2, and the result will be that the piston 132 and member 130 moves upward to counteract the previous called for downward movement. The member 130 movement on lever 128 will be reflected on the metering valve 54 and will be limited by the feedback lever similarly as described before. This motion comes to a halt as soon as the gas producer rotor reaches the selected speed.

Although the invention has been described by reference

I claim:

1. In a fuel control for a gas turbine engine having a fuel metering valve, a movable member longitudinally responsive in proportion to gas producer rotative speed, a manually operable power lever, a pivot connection movable as a function of said power lever, a feedback lever having one end thereof pivotally connected to said pivot connection, an actuating pivot carried by said feedback lever and positioned a distance from said pivot connection, means operable to close said metering valve, a hydraulic valve actuated member for actuating said means, a lever centrally pivoted on said actuating pivot and having one end thereof actuated by said movable member and the opposite end thereof contacting said hydraulic valve actuated member.

2. In a fuel control for a gas turbine engine having a rotating gas producer and fuel metering valve, said fuel control comprising a metering valve actuating member for controlling the opening of said metering valve, a hydraulic servo-mechanism for actuating said metering valve actuating member, a hydraulic valve for actuating said hydraulic servo-mechanism, a member longitudinally movable in proportion to gas producer rotative speed, a hydraulic valve actuating lever forming an operating connection from said longitudinally movable member to said hydraulic valve, a feedback lever movable by contact with said metering valve actuating member, a pivot for said hydraulic valve actuating lever carried on said feedback lever, a manually operable power lever, a power lever pivot connection movable as a function of the movement of said power lever and connected to said feedback lever a distance from said hydraulic valve actuating lever pivot whereby said hydraulic valve actuating lever pivot is positioned by movement of said feedback lever and by movement of said power lever.

References Cited in the file of this patent

UNITED STATES PATENTS

| | | |
|---|---|---|
| 2,284,687 | Schimanek | June 2, 1942 |
| 2,700,872 | Lee | Feb. 1, 1955 |
| 2,802,335 | Skellern | Aug. 13, 1957 |
| 2,820,340 | Dolza et al. | Jan. 21, 1958 |
| 2,853,851 | Chandler | Sept. 30, 1958 |
| 2,857,741 | Evers | Oct. 28, 1958 |
| 2,918,792 | Fortman | Dec. 29, 1959 |
| 2,931,168 | Alexander | Apr. 5, 1960 |
| 2,955,416 | Hegg et al. | Oct. 11, 1960 |

FOREIGN PATENTS

| | | |
|---|---|---|
| 29,056 | Great Britain | Nov. 10, 1910 |